March 31, 1925. 1,531,838
S. S. BONEL
CLOSED VEHICLE BODY CONSTRUCTION AND UPHOLSTERY THEREFOR
Original Filed May 7, 1921   3 Sheets-Sheet 1

INVENTOR
SPIRO S. BONEL
BY
Charles E. Visner
ATTORNEY

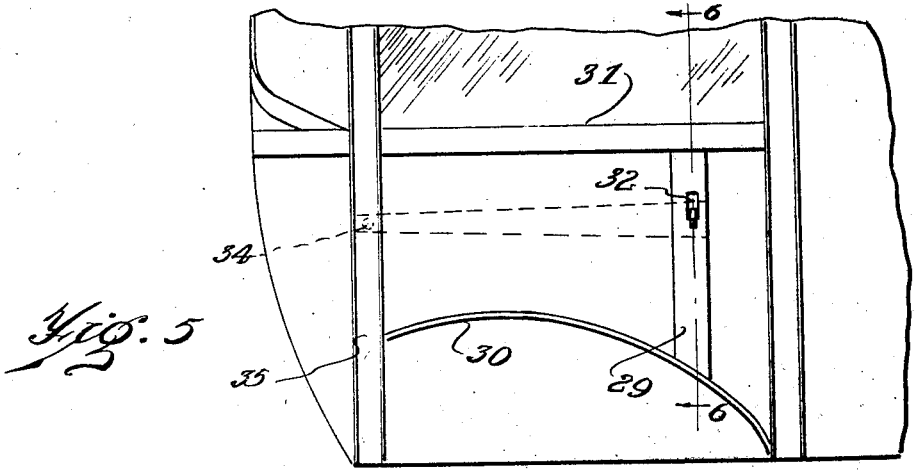
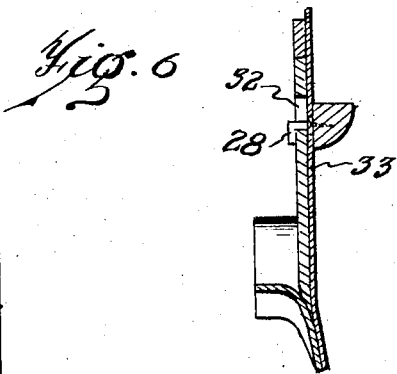
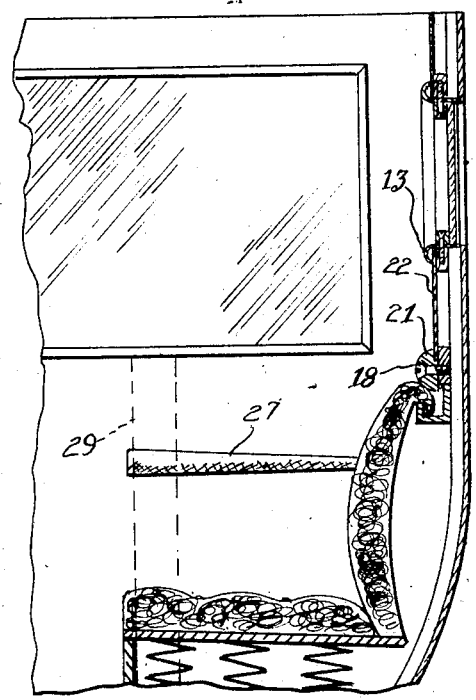
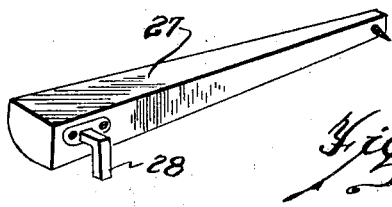

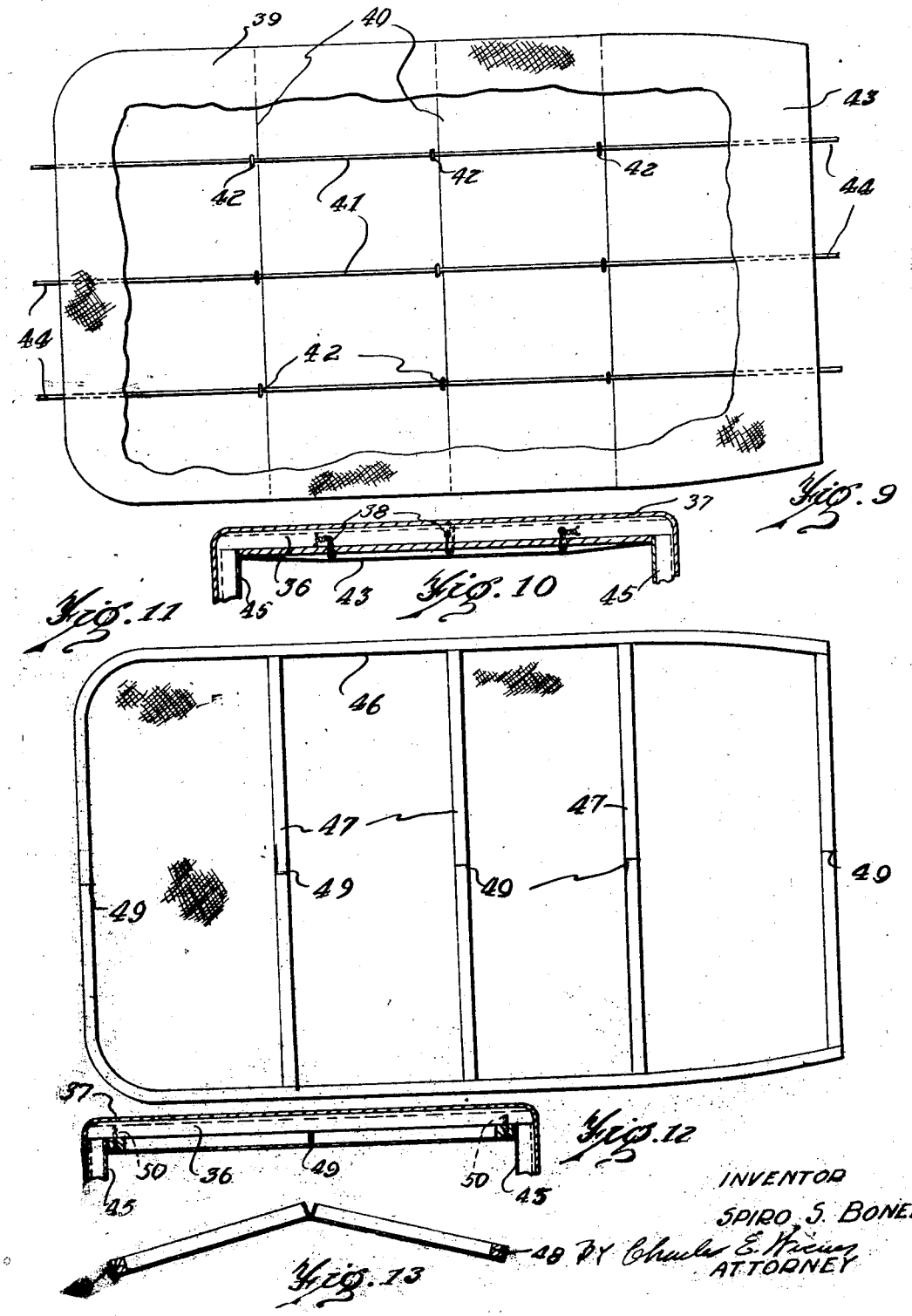

Patented Mar. 31, 1925.

1,531,838

UNITED STATES PATENT OFFICE.

SPIRO S. BONEL, OF DETROIT, MICHIGAN.

CLOSED-VEHICLE-BODY CONSTRUCTION AND UPHOLSTERY THEREFOR.

Application filed May 7, 1921, Serial No. 467,531. Renewed November 13, 1924.

*To all whom it may concern:*

Be it known that I, SPIRO S. BONEL, a subject of the King of Great Britain, residing at Detroit, county of Wayne, State of Michigan, have invented a certain new and useful Improvement in Closed-Vehicle-Body Construction and Upholstery Therefor, and declare the following to be a full, clear, and exact description of the same, such as will enable others skilled in the art to which it pertains to make and use the same, reference being had to the accompanying drawings, which form a part of this specification.

This invention relates to closed vehicle bodies and upholstery therefor, and the object of the invention is to provide an automobile body of all metal construction so formed as to allow the upholstery to be secured thereto. Another object of the invention is to provide a closed vehicle body in which the edges of the upholstery are covered to give a finished appearance to the interior thereof. The main objection heretofore to the all metal closed body has been the difficulty of securing the upholstery therein. Therefore, the principal object of this invention is to provide an all metal body in which the upholstery is secured therein by flanges or beaded members either formed integral with or secured to the body. These objects and the several novel features of the invention in its preferred form are hereinafter more fully described and claimed and shown in the accompanying drawings in which—

Fig. 5 is a view of the rear portion of the body showing the method of securing the back seat arm and adjacent upholstery panel in place.

Fig. 6 is a section taken on line 6—6 of Fig. 5.

Fig. 7 is a perspective view of one of the back seat arms.

Fig. 8 is a section through the rear of the body showing an alternative form of construction to that shown in Fig. 4.

Fig. 9 is a view of one form of roof or ceiling upholstery.

Fig. 10 is a section showing the method of securing the ceiling upholstery shown in Fig. 9 to the body top.

Fig. 11 is a view of an alternative form of ceiling upholstery.

Fig. 12 is a view showing the method of securing the ceiling upholstery shown in Fig. 11 to the body top.

Fig. 13 is a section showing the method of folding the ceiling upholstery before securing in the body top.

Figure 1:
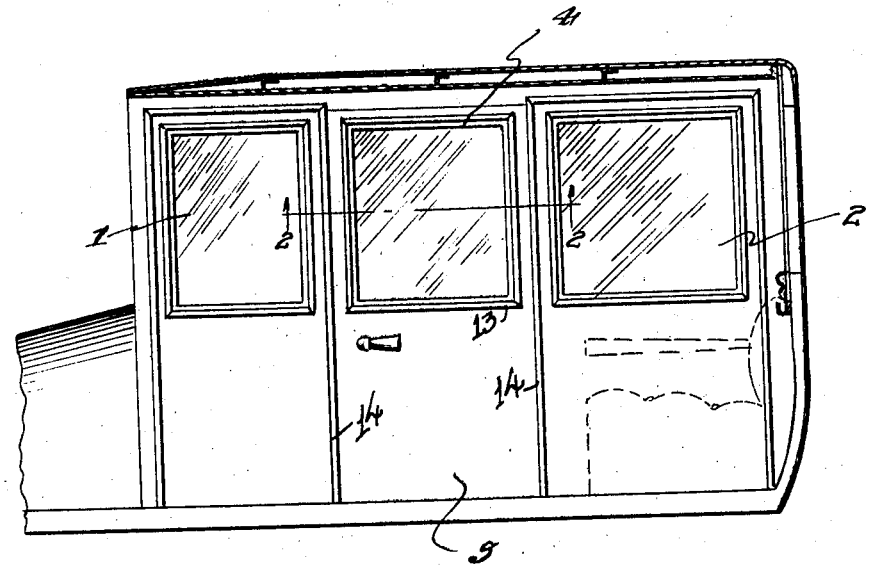
Fig. 1 is a section through a closed automobile body embodying my invention.
Figure 2:
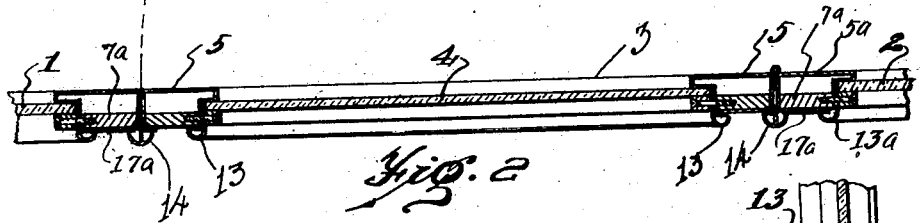
Fig. 2 is an enlarged section taken on line 2—2 of Fig. 1.
Figure 3:
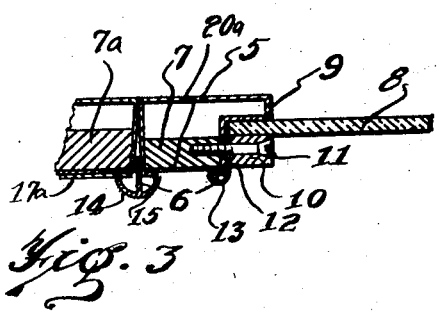
Fig. 3 is an enlarged view showing the method of covering the edge of the door and adjacent panel of the body by a double bead.

As shown in Fig. 1, an automobile body is provided having an all metal framework, the body being provided with windows 1 and 2 and a door 3 having a window 4. In the construction of the door as shown in Fig. 2, a metal frame member 5 is provided at each side preferably formed of heavy sheet metal and having a flanged inner edge 6 as shown more particularly in Fig. 3, the frame member being open between the flanges 6. Fitting in this frame member 5 is a metal piece 7 rectangular in cross section and between this member 7 and the flange 6 is inserted a strip of upholstery 20ª which consists of a fiber board base with the upholstery cloth sewed thereover. To hold the window glass 8 in place in the door 3 I provide a flanged portion or protuberance 9 against which one face of the window glass 8 may engage. A strip 10 of wood or metal as may be desired is then provided which extends about the edges of the window to hold the same in place and at equidistant points through the strip 10 are screws 11. To cover the edge of the upholstery and flange 6 adjacent the window 4 a strip 12 is provided having a rounded or beaded edge 13 adapted to provide a neat beaded finish about the window. The screw 11 is then passed through the strip 10, the strip 13, through the frame member 5, and is threaded into the strip 7 which secures the parts together holding the bead 13 and the strip 10 in place, which prevents movement of the window glass 8. This construction is peculiarly adapted for the door as the flanges 6 hold the upholstery panels in place when the door is swung outwardly away from the double beads 14. The construction about the stationary windows 1 and 2 is slightly different. In this case the frame member 5ª is closed on all sides a member 7ª being provided similar to the member 7 in the door frame member within the member 5ª. A strip 13ª is then provided similar to the strip 13 and is secured to the member 5 in the manner shown in Fig. 2. The upholstery panel 17ª is then positioned beneath one side of the double bead 14 and the inner edge of the upholstery panel adjacent the stationary window is held in place by the bead 13ª. The bead 13ª extends completely about the window and covers the edges of the upholstery thereby giving a very neat appearance to the interior of the body. To cover the joint between the door and adjacent body portion a double beaded member 14 is provided which has a central tongue 15. This tongue 15 is secured to the stationary body portion by screws or the like, one side of the bead 14 covering and forming a support for the edge of the panel on the stationary portion of the body and the opposite side of the bead 14 covering the respective flange 6 and panel edge on the movable door. The object of this bead 14 is to cover the joint between the door and stationary body portion. When the door is swung open the flanges 6 support the upholstery therein and when the door is shut the beads 14 cover the joint or crack between the door edge and adjacent edge of the stationary body portion thereby giving a neat appearance to the interior of the body.

Figure 4:
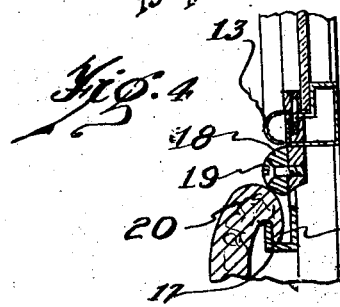
Fig. 4 is an enlarged section through the body showing the rear window frame construction and method of holding the back cushion of the rear seat in place.

To hold the back cushion of the rear seat in place the said cushion is provided with a hooked edge 16 and a channel member 17 preferably formed of metal is secured to the framework in the rear end of the body. This hook member 16 is positioned within the said channel member 17 as shown in Fig. 4, and thus the back cushion is supported. To prevent removal of the back cushion from the channel 17 I provide a large bead or molding 18 which may be formed of mahogany or other wood if desired to give a neat appearance to the interior of the body. This molding 18 extends across the rear of the body to the opposite edges of the rear seat and is secured to the body frame members by screws 19. The window construction in the rear end is identical with that shown in the windows 1 and 2 in Fig. 2 and the bead 13 at the lower end of the window in this case, abuts the bead or molding 18 as shown, which is the construction used when the distance between the top of the back cushion 20 and the lower edge of the rear window is very slight. When the rear window is very small as shown in Fig. 8, a slightly different construction is provided. In this case the molding 18 is provided with a groove 21 to receive the lower edge of the upholstered panel 22, the upper edge of the upholstered panel 22 being positioned beneath the edge of the bead 13 and held in place thereby. As an arm rest is often used for the rear seat I provide an arm rest 27 which is covered with upholstery cloth and is also provided with a depending hook 28. A short frame member 29 is provided between the edge of the rear fender 30 and frame member 31. This frame member 29 is provided with a rectangular aperture 32 therein and in assembly the arm rest 27 is secured to the upholstery panel 33 as shown in Fig. 6 with the hook 28 protruding therethrough. The upholstery panel 33 is then positioned in the respective beads 13 and the hook 28 is hooked through the aperture 32 as shown in Fig. 6 thereby securing the arm rest 27 to the body frame and also holding the upholstered panel in position. This arm rest 27 at the rear is provided with a screw 34 which is threaded into the adjacent frame member 35 thus securing the rear end of the arm rest in place.

In this manner the upholstery panels for the interior of the car are held in place by the flanges 6 of the frame members on the door and the beads 13 on the stationary portion of the body thereby giving a very neat appearance to the interior of the body and doing away with the necessity of tacking the panels in place and then covering the tacks by strips of braid which is the usual practice.

A top is provided for the body consisting of a series of angle iron supporting members 36 to which the sheet metal roof 37 is secured. These angle iron members are each provided with apertures 38 therein for a purpose hereinafter described. To form the upholstery covering for the ceiling or under side of the roof of the body I provide a panel 39 of a size sufficient to fit the roof consisting of a fiber board backing which is covered with upholstery cloth, the upholstery cloth being cut away in Fig. 9 to show the construction. The panel 39 is hinged at several points 40 so that the panel may be folded to aid in placing the panel in position. This panel is supported by a series of longitudinal wires or rods 41 and about each wire is a series of short wire looped members 42 extending through the panel. The cloth covering 43 is then secured over the wires 41 and 42 thus hiding the same from view and providing a ceiling apparently of a single piece when assembled. In assembly the panel 39 is positioned against the lower edges of the angle iron supports 36 and the looped wires 42 are passed through the apertures 38 and twisted as shown thereby securing the panel 39 in position in the top of the body. The rods 41 are provided with extending ends 44 which are passed through apertures 38 in the front and rear members 36. By this construction the rods 41 support the ceiling panel in place and the outer edges of the panel 39 also hold the edges of the vertical panels 45 in place, as shown in Fig. 10.

In Fig. 11 I have illustrated an alternative form of ceiling panel which is slightly more expensive than that shown in Fig. 9. This ceiling panel is formed with an outer frame member 46 of light wood construction having a series of cross members 47 of the same material. The upholstery cloth is tacked to the outer edges of the frame 46 by tacks 48, as shown in Fig. 13, the upholstery cloth covering the under side of the ceiling panel and being also secured to the cross members 47 in any desired manner. The frame 46 and members 47 are cut in two at 49 and hinged together so that the panel may be folded as shown in Fig. 13. By folding the panel as shown the panel may be positioned adjacent the roof of the body and extended to the position shown in Fig. 12. In this case the angle iron supports 36 are provided with tapped apertures for the screws 50 which extend through the frame member 46 and into the supporting angle iron 36. In this manner the frame 46 and upholstery cloth is secured in position as a unit the edges of the frame 46 binding the upper edges of the vertical panels 45 in the correct position as shown and as the tacks 48 for securing the upholstery cloth are provided on the edge of the frame 46 the said tack heads are hidden from sight.

From the foregoing description it becomes evident that the construction is simple and efficient, providing a strong and reliable means for securing the upholstery in place and provides a construction which accomplishes the objects desired.

Having thus fully described my invention, its utility and mode of operation, what I claim and desire to secure by Letters Patent of the United States is—

1. An all metal body construction for vehicles and upholstery therefor comprising the combination with a sheet metal body portion and frame members supporting the same, said frame members on the interior being formed with flanged portions, upholstery panels adapted to be set in position in the said flanged portion, each panel consisting of a base and a cloth cover secured thereto corresponding to the seat upholstery, and a series of bead members secured to the frame members and covering the said flanges and adjacent panel edges.

2. An all metal body construction for vehicles and upholstery therefor comprising in combination with a sheet metal body portion and frame members supporting the same, a channel member secured to the rear frame members in approximately a horizontal position, a back cushion for the rear seat shaped to hook over the said channel member, and a molding secured to the rear frame members preventing removal of the back cushion from the channel member.

3. An all metal body construction for vehicles and upholstery therefor comprising the combination with a sheet metal body portion and frame members supporting the same, said frame members on the interior being formed with flanged portions, panels held in place by said flanged portions each panel consisting of a base and a cloth covering secured thereto corresponding with the seat upholstery, a channel member secured to the frame members at the rear of the body in approximately a horizontal position, a back cushion for the rear seat shaped to hook over the said channel member, a bead secured to the frame member adjacent the channel member to prevent removal of the back cushion, and a seat cushion adapted to hold the lower edge of the back cushion in place.

4. An all metal body construction for vehicles and upholstery therefor comprising in combination with a sheet metal body portion and frame members supporting the same, a channel member secured to the frame member at the rear in a horizontal position, a back cushion for the rear seat shaped to hook over the said channel member, a molding secured to the frame member adjacent the channel member and preventing removal of the back cushion, said molding being provided with a groove, an upholstery panel seating in the said groove, and a bead about the edge of the said panel for securing the same in place.

5. An all metal body construction for vehicles and upholstery therefor comprising in combination with a sheet metal body portion and frame members supporting the same, said frame members on the interior being formed with flanged portions, upholstery panels adapted to be set in position in the flanged portion, each panel consisting of a base and a cloth cover secured thereto corresponding with the seat upholstery, a channel member secured to the frame members at the rear of the body in a horizontal position, a back cushion for the rear seat shaped to hook over the said channel member, a frame member at each side of the rear seat provided with an aperture therein, an arm rest secured to the panel on each side of the rear seat and having a hook member extending therethrough, the said hook member engaging in the aperture in the respective frame member and supporting the arm and respective panels in position, the edges of the said panels engaging beneath the flanges of the frame members, and a bead covering each flange member and adjacent edge of the panels.

6. An all metal body construction for vehicles and upholstery therefor, comprising the combination with a sheet metal body portion and frame members supporting the same, a door in the side of the body, said frame members of the door being formed with flanges on the interior thereof, upholstery panels adapted to be set in position in the said flanges, each panel consisting of a base and a cloth cover secured thereto, a double bead secured to the body and covering the flanges on the door when closed, a series of beads or curved flanges about the windows of the body, a series of panels adapted to be set in the said beads or curved flanges, and a collapsible cloth covered frame adapted to be secured to the roof of the body and holding the upper edges of the panels in position.

7. An all metal body construction for vehicles and upholstery therefor, comprising the combination with a sheet metal body portion and frame members supporting the same, the said frame members on the interior being provided with flanged portions, a series of upholstery panels adapted to be set in position in the said flanged portions and a foldable ceiling panel adapted to be attached to the roof framework and holding the upper edges of the said panels in position.

8. An all metal body construction for vehicles and upholstery therefor, comprising in combination a sheet metal body portion and frame members supporting the same, said frame members on the interior being provided with flanged portions, cloth covered panels adapted to be secured by the flanges of the frame members, and strips positioned within the body covering the said flanges.

9. An all metal body construction for vehicles and upholstery therefor comprising in combination with a body portion, frame members supporting the same, beaded members secured to the frames on the interior to extend inwardly from each edge thereof, upholstery panels adapted to be positioned between the frames with the edges of the panels covered by the said beaded portions, each panel comprising a base and a cloth cover secured thereto corresponding to the seat upholstery.

In testimony whereof, I sign this specification.

SPIRO S. BONEL.